United States Patent [19]
Mohri et al.

[11] 3,941,930

[45] Mar. 2, 1976

[54] SYNCHRONIZING SIGNAL REGENERATOR

[75] Inventors: Katsuo Mohri, Yokohama; Yoshizumi Watatani, Machida; Hiroaki Nabeyama; Takehiko Yoshino, both of Yokohama, all of Japan

[73] Assignees: Hitachi, Ltd.; Nippon Noso Kyokai, both of Tokyo, Japan

[22] Filed: Apr. 15, 1974

[21] Appl. No.: 460,971

[30] Foreign Application Priority Data
Apr. 18, 1973 Japan.............................. 48-43183

[52] U.S. Cl. ..... 178/69.5 R; 178/69.5 G; 179/15 BS
[51] Int. Cl.²......................................... H04L 7/00
[58] Field of Search................. 178/69.5 R, 69.5 G; 179/15 BY, 15 BS; 325/325

[56] References Cited
UNITED STATES PATENTS
3,573,634  4/1971  Rachel.......................... 178/69.5 R

*Primary Examiner*—Charles E. Atkinson
*Assistant Examiner*—Errol A. Krass
*Attorney, Agent, or Firm*—Stevens, Davis, Miller & Mosher

[57] ABSTRACT

A synchronizing signal regenerator for regenerating all the required synchronizing signals from a composite signal having a plurality of synchronizing signals having a different repetition period and phase. The composite signal comprises a video signal and a pulse code modulated audio multiplex signal arranged in a predetermined sequence. The composite signal further comprises a first synchronizing signal consisting of a certain predetermined pulse series synchronized with a modulated pulse series of the audio multiplex signal and a second pulse code modulated synchronizing signal including a plurality of other synchronizing signals required for the reproduction of the video signal and the audio multiplex signal. The synchronizing signals are inserted at a certain predetermined portion in the video signal and in the audio multiplex signal.

The synchronizing signal regenerator comprises means for reproducing the first synchronizing signal after detecting the insertion position of the first synchronizing signal, a means for reproducing a predetermined part of a synchronizing signal among the second synchronizing signals using the first synchronizing signal as the reference, a means for frequency dividing at least one of the reproduced parts of the second synchronizing signal, and means for synchronizing the frequency divided signal by using the parts of the second synchronizing signal having the same phase as the other second synchronizing signals to be reproduced among said part of the second synchronizing signals.

7 Claims, 8 Drawing Figures

FIG_1

FIG_2

FIG.-4

FIG_6

FIG_7

FIG_8

SYNCHRONIZING SIGNAL REGENERATOR

BACKGROUND OF THE INVENTION

The present invention relates to a synchronizing signal regenerator for receiving a composite signal having a video signal and pulse code modulated audio multiplex signal arranged in a predetermined sequence and a plurality of pulse code modulated synchronizing signals being inserted in a predetermined position of said video signal and audio multiplex signal and required for the reproduction of said video signal and audio multiplex signal, and for reproducing signals each synchronizing with said plurality of synchronizing signals included in said composite signal.

A preferred embodiment of such a composite signal is a still picture broadcasting signal. Accordingly, the synchronizing signal regenerator according to the present invention is particularly suitable for use in a still picture broadcasting signal receiver.

The still picture broadcasting system has been disclosed in application Ser. No. 361,581 filed on May 18, 1973, now U.S. Pat. No. 3,854,010.

At first a brief explanation of said system will be given below.

In a still picture broadcasting signal transmission system, the video signal and the audio signal are transmitted alternately in a predetermined sequence. In one system of the still picture broadcasting signal, a video signal of 1/30 second duration and audio signal of 1/15 second duration are transmitted alternately. The video signal is transmitted at each horizontal scanning period of $1/f_H$ ($\approx 63.5$ $\mu$S) which is the same as a standard television braodcasting signal in a video signal transmission period. One video signal transmitted in one period of 1/30 sec represents one still picture, and therefore, at each video signal transmission period, one particular still picture content may be transmitted. In the audio signal transmission period, the audio signal is sampled at a repetition period of $1/f_A$ which is different from that of the video signal. The audio signal is pulse code modulated and a number of such audio signals are multiplexed by a time division multiplex system and transmitted at said sampling period $1/f_A$. The synchronizing signals required for the reproduction of the video signal and audio signal are transmitted at each $1/f_H$ period during the transmission of the video signal and $1/f_A$ period during the transmission of the audio signal. Besides the above-mentioned two synchronizing signals having two different repetition periods, various synchronizing signals are required having a different repetition period. The synchronizing signals which include such a kind of synchronizing signals mentioned above are constituted from pulse code modulated signals. More exactly, the synchronizing signals are formed by a blanking period, PCM frame pattern signal (referred to as PFP signal) for detecting the position of the synchronizing signal and having a predetermined pattern of pulses having the same bit timing with a modulated pulse series of the audio multiplex signal, and a mode control signal (referred to as MCC signal) formed of a horizontal synchronizing signal, audio PCM frame signal, video frame synchronizing signal, etc.

In the still picture broadcasting signal, the repetition period $1/f_H$ of the synchronizing signal transmitted in the video signal transmission period and the repetition period $1/f_A$ of the synchronizing signal transmitted in the audio signal transmission period are selected to be in a simple integral ratio relationship. Also the bit period $t_b$ of the pulse series forming the PFP signal and forming the modulated pulse series of the audio multiplex signal is so chosen to be in an integral ratio with said period of $1/f_H$ and of $1/f_A$.

In order to receive the abovementioned still picture broadcasting signal and to display a selected picture on a picture display device and to reproduce a transmitted audio signal corresponding to said picture, it is necessary to detect the pulse code modulated synchronizing signal comprising the PFP signal and the MCC signal and to regenerate synchronizing signals for a respective period. The synchronizing signals formed by the PFP signal and the MCC signal are inserted in respective video and audio signals at their peak level substantially the same as that of the video and audio signals. Accordingly, the conventional means for separating the synchronizing signal from a standard television signal, such as for instance, an amplitude separating circuit using a slice circuit cannot be used for the detection of the synchronizing signal of the aforementioned still picture broadcasting signal. For the detection and reproduction of the synchronizing signal, a synchronizing signal regenerator having a particular synchronizing signal detector circuit is required.

For the detection and reproduction of a number of synchronizing signals, a corresponding number of detector circuits and a corresponding number of synchronizing signal regenerators are required.

SUMMARY OF THE INVENTION

An object of the present invention is to provide a novel and effective synchronizing signal regenerator suitably used in a receiver for the still picture broadcasting signal.

Another object of the present invention is to obtain a novel synchronizing signal regenerator having very simple construction.

A further object of the present invention is to obtain a synchronizing signal regenerator suitable for the reproduction of the synchronizing signal inserted in such a still picture broadcasting signal.

A still further object of the present invention is to realize a synchronizing signal regenerator able to accurately reproduce all of the synchronizing signals being transmitted at different repetition frequencies and/or different phases.

Again a further object of the present invention is to realize a synchronizing signal regenerator able to reproduce all of the transmitted synchronizing signals transmitted in different frequencies and/or different phases by detecting only a part of such synchronizing signals.

According to one aspect of the present invention, the synchronizing signal regenerator for reproducing all of the synchronizing signals by receiving a composite signal having a predetermined sequence of a video signal and pulse code modulated audio multiplex signal, a first synchronizing signal consisting of a series of a predetermined number of pulses synchronized with the modulated pulse series of the audio multiplex signal and a pulse code modulated second synchronizing signal including a number of other synchronizing signals required for the reproduction of said video signal and audio multiplex signal, of which synchronizing signals are inserted in predetermined positions of the video signal and the audio multiplex signal, is characterized in that it comprises;

a means for detecting said first synchronizing signal, a means for detecting a predetermined part of the synchronizing signal among the second synchronizing signals by using the detected first synchronizing signal as a reference and for reproducing a signal synchronized with said detected synchronizing signal, a means for dividing the frequency of at least one of the reproduced second synchronizing signals, and a means for synchronizing said frequency divided signal by using a synchronizing signal having a common phase with the other second synchronizing signals to be reproduced among the reproduced second synchronizing signals.

DESCRIPTION OF THE PREFERRED EMBODIMENTS

Before making a detailed explanation of the embodiments of the present invention, an example of a composite signal suitable to be received by a receiver using a synchronizing signal regenerator according to the present invention, such as a still picture broadcasting signal receiver will be explained be referring to FIGS. 1 and 2.

Figure 1:
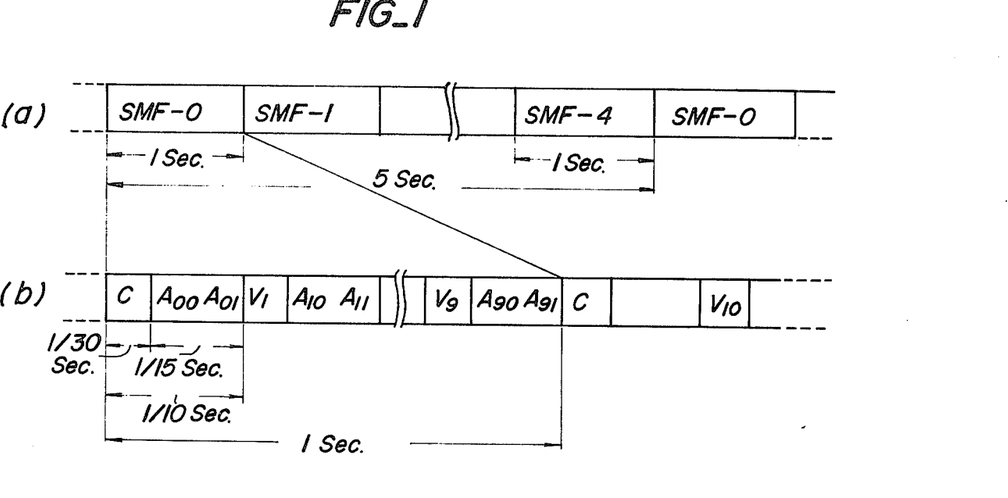
FIGS. 1 and 2 are signal system diagrams of one example of a still picture broadcasting signal.

As shown in FIG. 1, the still picture broadcasting signal has a 5 second repetition period. In one 5 second period, five submaster frames SMF-0, SMF-1, . . . SMF-4, each having a 1 second duration, are sequentially inserted. After a lapse of 5 seconds, the same submaster frame is transmitted again. One submaster frame SMF consists of 30 television frames each having 1/30 second duration. Among the 30 television frames, nine television frames are used for inserting video signals and are termed as video frames V. One video signal of each one television frame can represent one particular picture. By inserting different video signals each representing different picture content into a respective video frame V, nine kinds of picture can be transmitted per one submaster frame SMF. As there are five submaster frames, 9×5=45 kinds of pictures can be transmitted per one still picture broadcasting signal. Another 20 frames are used for inserting audio signals and are termed audio frames A. Two successive television frames are used for audio frames A, of which the former half is termed an audio first frame and the latter half is termed an audio second frame. In the audio frame A, pulse code modulated audio signals for a number of channels are inserted in time division multiplex. The rest of the television frames is used as a control frame C for inserting control signals. In a still picture broadcasting system, the aforementioned plurality of video and audio signals are combined to form one still picture program. The combinations of such a number of video and audio signals are reproduced at a desired sequence or at a predetermined sequence. The control signals inserted in the control frame C are the signals for designating the combination of the video and audio signals and for designating the sequence for reproduction thereof. The control frame C is located at the top of a submaster frame SMF.

Figure 2:
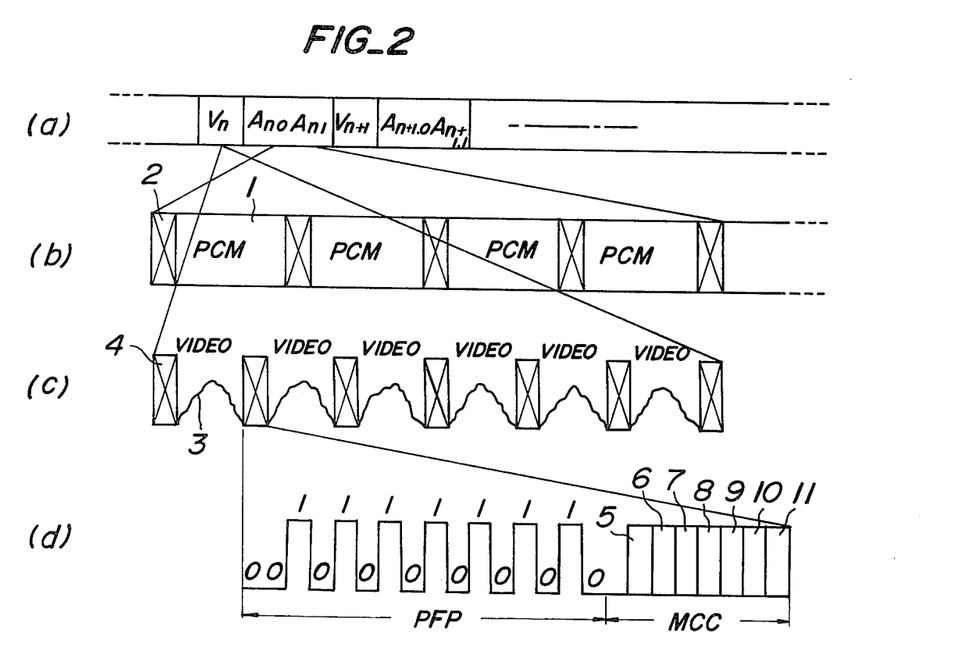

FIG. 2 shows a more detailed signal wave form to be inserted in the video frame V and in the audio frame A. In the audio frame A, a pulse code modulated audio multiplex signal 1 and a synchronizing signal 2 are inserted as shown in FIG. 2-b. The audio multiplex signal 1 is transmitted at a repetition period of $1/f_A$ ($f_A \approx 10.5$ KHz), which is equal to the sampling period of the audio signal. This repetition period is hereinafter termed an audio PCM frame period. Accordingly, the synchronizing signal 2 required for the reproduction of the audio signals is inserted at a repetition period of $1/f_A$. In the video frame V, a video signal 3 having the same form as a signal used with an NTSC system and a sychronizing signal 4 of a modified type are inserted as shown in FIG. 2-c. The synchronizing signal 4 is inserted at each horizontal period $1/f_H$ ($f_H=15.734$ KHz). Therefore, the repetition frequencies of the synchronizing signals 2 and 3 are in a relation of $f_A/f_H=\frac{2}{3}$. The positions of the two synchronizing signals 2 and 4, i.e., the phases of the two synchronizing signals 2 and 4 coincide at the greatest common measure frequency of about 5 KHz of the frequencies $f_H$ and $f_A$. The sychronizing signals 2 and 4 are made of a PCM frame pattern signal, which is referred to as PFP signal, and a mode control code signal, which is referred to as an MCC signal.

The PFP signal is a train of pulses synchronized with a modulated pulse series of the audio multiplex signal and made of a 16 bit fixed pulse pattern of 0010101010101010. By using this fixed pulse pattern, a bit signal $f_b$ of 6.5454 MHz for taking the timing of said pulse code modulated signal (PCM signal) is reproduced. The PFP signal is not only synchronized with the pulse series of the audio PCM signal, but it acts as a pilot signal for detecting the synchronizing signal including the PFP signal. The MCC signal represents the repetition period of various synchronizing signals. The MCC signal itself may be used as a synchronizing signal and is formed of 8 bit pulses. The 8 bit MCC signal contains seven kinds of synchronizing signals, i.e., a horizontal synchronizing signal 5 of repetition frequency 15.734 KHz, an audio PCM frame synchronizing signal 6 of repetition frequency 10.5 KHz, a frame synchronizing signal 7 of repetition frequency of 30 Hz, a synchronizing signal 8 for showing the location of the control frame of repetition frequency of 1 Hz, synchronizing signals 9, 10 for showing the frame position of the first and second audio frames, and a synchronizing signal 11 for showing the position of the video signal. For these synchronizing signals 5-11, the respective synchronizing signal exists when the corresponding pulse has a value 1 and does not exist when the corresponding pulse has a value 0.

Figure 3:
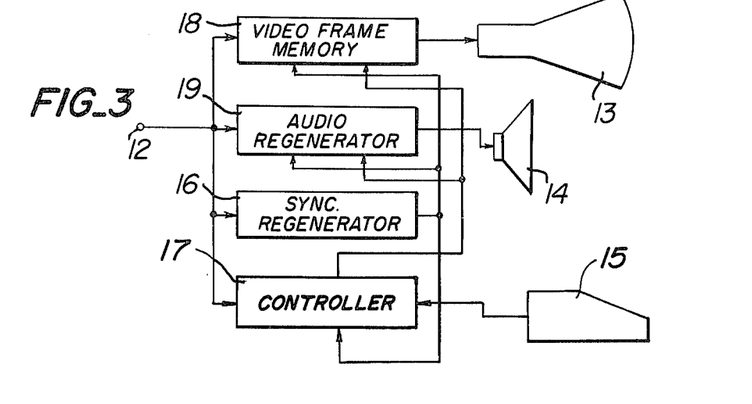
FIG. 3 is a block diagram for showing an outline of a still picture broadcasting signal receiver.

The still picture broadcasting signal shown in FIGS. 1 and 2 is received by a receiver shown in FIG. 3.

FIG. 3 is a block diagram for showing the outline of a still picture broadcasting signal receiver. Referring to FIG. 3, the still picture broadcasting signal is applied to an input terminal 12. From this still picture broadcasting signal supplied to the terminal 12, various synchronizing signals are derived and reproduced by synchronizing signal regenerator 16. Thus, reproduced various synchronizing signals required for the reproduction of the video and audio signals are fed to various portions of the receiver as indicated by the arrow marks. An instruction keyboard 15 produces instruction signals for deriving a desired pair of video and audio signals and applies it to controller 17. The controller 17 produces a trigger pulse for keying out the designated video and audio signals designated by said instruction signal when these signals are transmitted. This trigger pulse is supplied to a video frame memory 18 and also to an audio regenerator 19. The video frame memory 18 keys out only the desired video signal out of the still picture broadcasting signal based on the trigger pulse and memorizes picture information of one frame duration. By repeatedly reproducing the memorized signal and supplying it to a cathode ray tube 13 as a continuous signal, a still picture is obtained. The audio regenerator 19 picks up the desired audio signal from the still picture broadcasting signal based on said trigger pulse and supplies it to a speaker 14 by which the desired voice is reproduced.

Figure 4:
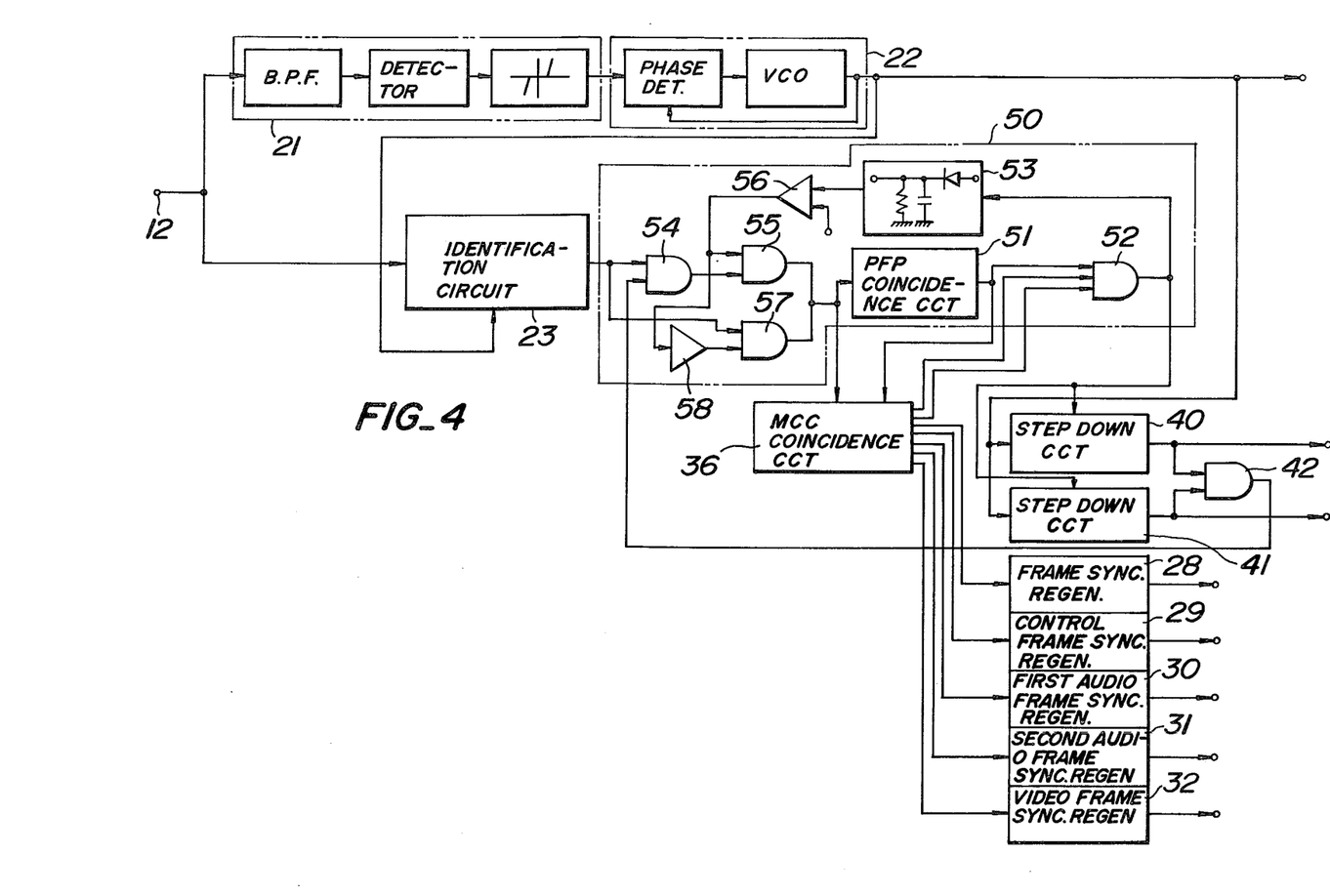
FIG. 4 is a block diagram for showing one embodiment of a synchronizing signal regenerator used in a receiver of a still picture broadcasting signal.

FIG. 4 is a block diagram for showing more detail of the synchronizing signal regenerator 16 of the still picture broadcasting signal receiver.

In FIG. 4, 21 indicates a bit synchronizing signal detector circuit for detecting a signal having a bit synchronizing frequency component from the input signal. The bit synchronizing signal detector circuit 21 comprises a band-pass-filter for selecting a bit synchronizing frequency component, a circuit having a square curve characteristic such as a detector, and an amplitude selection circuit for deriving a signal having an amplitude exceeding a predetermined amplitude. The bit synchronizing signal detector circuit 21, detects from the input still picture broadcasting signal, the PFP signal in the synchronizing signal and the bit timing signal inserted in the PCM signal in the audio frame. By means of the detected bit timing signal, the synchronization of the bit synchronizing signal regenerator 22 is adjusted and a bit signal of about 6.54 MHz synchronized with the input bit synchronizing signal is obtained. The bit synchronizing signal regenerator 22 comprises a phase detector and a voltage controlled oscillator.

In an identification circuit 23, the regenerated synchronizing signal is used as a timing pulse and the input signal is identified to obtain a wave form shaped pulse signal. The identification circuit 23 is known per se and it may be formed by various conventional ways. The input signal identified in the identification circuit 23 and wave form shaped is supplied to a PFP signal detecting circuit 50.

In the PFP signal detecting circuit 50, the input signal is supplied to a PFP coincidence circuit 51 via an AND gate 57 or AND gates 54 and 55. The PFP coincidence circuit 51 checks the input signal as to the pulse pattern of the predetermined bit number by checking each input bit unit. When the PFP signal is in the input signal as shown in FIG. 2-d is detected, the circuit 51 produces a coincidence pulse at its output. 1

Figure 7:
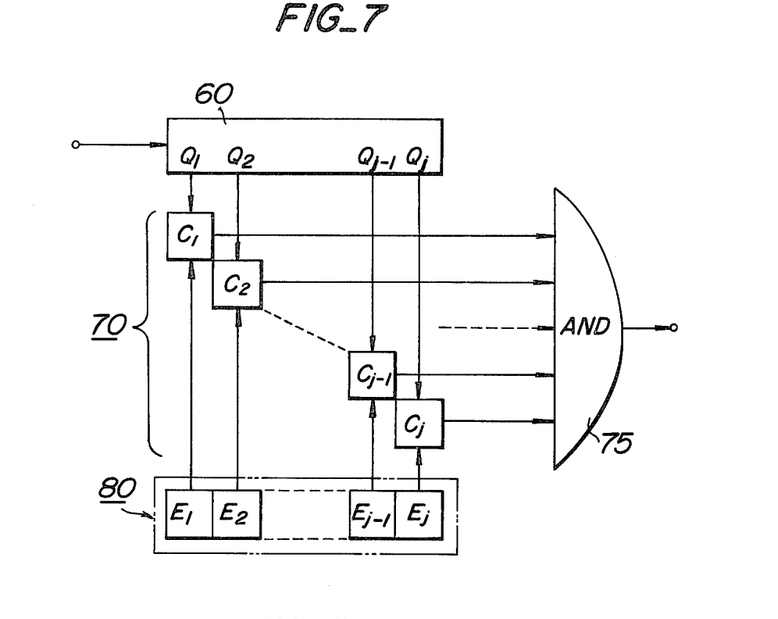
FIG. 7 is a block diagram for showing one embodiment of a PFP coincidence circuit.

One embodiment of such PFP coincidence circuit 51 is shown in FIG. 7. Referring to FIG. 7, 60 is a shift register being able to store 16 bit signal. 70 shows a comparator for comparing a pulse pattern produced by a fixed pulse pattern generator 80 and that of the input signal being received and stored in the shift register 60 by comparing each signal bit by bit. The comparator 70 comprises a group of bit comparators $C_1, C_2 \ldots C_j$. Each of the bit comparators makes a comparison of the pulse of each bit. The fixed pulse pattern generator 80 comprises current source groups $E_1, E_2 \ldots E_j$ for producing a dc voltage having the 16 bit pattern of the PFP signal, which is 0010101010101010 as shown in FIG. 2-d. Namely, for obtaining the PFP signal pattern, 16 sources of $E_{1l} - E_j$ are provided. The output voltage level of the source $E_j$ is made a low level or earth level corresponding to the "0" value of the 1st bit of the PFP signal. The output voltage of the source $E_{j-1}$ is also made a low level or earth level corresponding to the "0" value of the 2nd bit of the PFP signal. The output voltage level of the next source $E_{j-2}$ (not shown) is made high corresponding to the 3rd bit "1" of the PFP signal. In the same manner, each source corresponding to "0" of the PFP signal produces a lower voltage level or earth potential and each source corresponding to "1" of the PFP signal produces a higher voltage level. The respective output levels of the sources $E_1-E_j$ are compared with respective outputs of output terminals $Q_1-Q_j$ of each stage of the shift register by the bit comparators $C_1-C_j$. Each of the bit comparators $C_1-C_j$ produces an output pulse when the two input potentials to be compared coincide with each other. The outputs of all of the bit comparators $C_1-C_j$ are supplied to an AND gate 75 and a logic product thereof is obtained. Accordingly, the AND gate 75 delivers a coincidence pulse at its output only when all the bit comparators $C_1-C_j$ deliver pulses simultaneously. Therefore if a PFP signal having a pulse pattern of 0010101010101010 is applied to the shift register 60, a coincidence pulse is obtained at the output.

With respect to FIG. 4, the input signal is applied also to a MCC coincidence circuit 36 at the same time with the application to the PFP coincidence circuit. Besides the input signal, the MCC coincidence circuit 36 receives a coincidence pulse from the PFP coincidence circuit and detects the presence or absence of respective pulses 5-11 succeeding to the PFP signal and corresponding to a respective synchronizing signal of the MCC signal. One embodiment of the MCC coincidence circuit is shown in FIG. 8.

Figure 8:
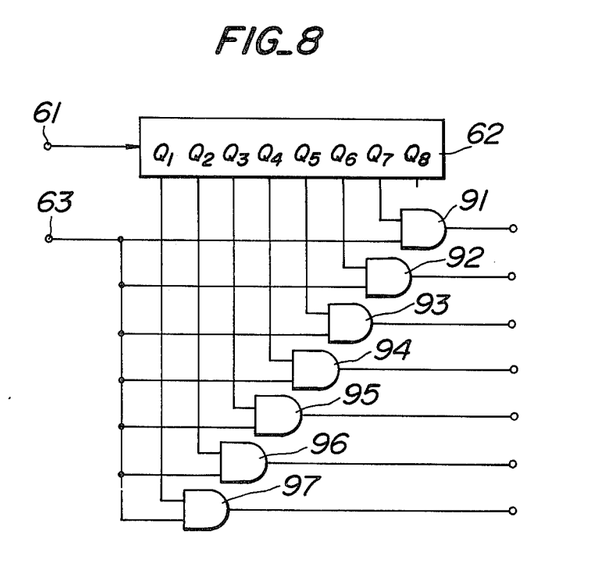
FIG. 8 is a block diagram for showing one embodiment of a MCC coincidence circuit.

Referring to FIG. 8, 62 is a shift register being able to store the 8 bit MCC signal. The input signal is supplied from an input terminal 61. An input terminal 63 receives the coincidence pulse produced in the PFP coincidence circuit. Said coincidence pulse is applied to the input terminal 63 at an instant after passing an 8 bit duration from an instant when the 16 bit PFP signal had been received by the PFP coincidence circuit. Namely, the coincidence pulse is applied to the input terminal 63 at an instant when the 8 bit MCC signal is just received by the shift register 62. The method of giving this delay is not shown but it may be realized either by providing an 8 bit delay circuit before the input terminal 63 or by supplying an output signal from the last stage output terminal $Q_8$ of the shift register 62 of the MCC coincidence circuit 36 to an input terminal of the shift register 60 of the PFP coincidence circuit 51. Output terminals $Q_1-Q_7$ of respective stages of the shift register 62 are connected to a respective one input terminal of two input AND gates 91–97 and to the other input terminals of the gate the coincidence pulse supplied from the input terminal 63 is applied in common. By this arrangement, from an AND gate connected to a stage of the shift register which corresponds to the pulse position having value "1" among the pulses 5–11 there is produced a coincidence pulse.

Among the coincidence pulses of the MCC signal, the coincidence pulses for showing the horizontal synchronizing signal ($f_H$) and audio frame synchronizing signal ($f_A$), i.e., the coincidence pulses produced from the AND gates 91 and 92 when the pulses 5 and 6 have value "1" are applied to an AND gate 52 together with the output from the PFP coincidence circuit 51. At the output of the AND gate 52, a pulse is delivered only when the three coincidence pulses are applied to the inputs simultaneously. Therefore, this output pulse has a repetition frequency of about 5 KHz which is the greatest common measure frequency of the horizontal synchronizing signal frequency $f_H$ (15.734 KHz) and the audio PCM frame synchronizing frequency $f_A$ (10.5 KHz). This pulse having the greatest common measure frequency is applied to step down circuits 40 and 41 as the reset pulse. The step down circuits 40 and 41 step down the output reproduced signal of the bit synchronizing signal regenerator 22 of about 6.54 MHz at a rate of 1/416 and 1/624, respectively, and produce $f_H$ and $f_A$ signals respectively. Accordingly, a horizontal synchronizing signal and audio PCM frame synchronizing signal being phase controlled by the reset pulse can be regenerated.

By applying the thus obtained horizontal synchronizing signal and audio PCM frame synchronizing signal to an AND gate 42, a pulse signal having the greatest common measure frequency of $f_H$ and $f_A$ can be obtained in the same manner as at the output of the aforementioned AND gate 52. By applying the obtained pulse from the AND gate 42 to an AND gate 54, it is possible to gate out only the synchronizing signal portion (PFP and MCC signals) corresponding to the period of greatest common measure frequency of $f_H$ and $f_A$ from the input signal so that a very stabilized synchronizing signal regeneration is possible by eliminating an unnecessary input signal for the synchronizing signal regeneration.

In a transient condition such as a starting time of the operation of the device, the signal obtained from the step down circuits 40 and 41 is not synchronized with the input synchronizing signal so that the gate signal obtained from these circuits, i.e., the gated input signal by the output of the AND gate 42 or the output signal of the AND gate 54 may not include the synchronizing signal. In this event, the synchronization is not attained for a substantial period. Therefore, in the time of such transient all the input signals should be supplied to the PFP coincidence circuit to detect the synchronizing signal at an early occasion. To this end a path for supplying the input signal without gating is provided. An AND gate 57 is provided for providing such circuit. The ungated input signal is supplied to the PFP coincidence circuit through the AND gate 57 during the period that the signals obtained by the step down circuits 40 and 41 are not synchronized with the horizontal synchronizing signal and audio PCM frame signal respectively. After synchronization of the output signals from the step down circuits 40 and 41 with the horizontal synchronization signal and audio PCM frame synchronizing signal respectively, the gated input signal is supplied to the PFP coincidence circuit 51 through the AND gate 55.

The switching of the AND gates 55 and 57 is effected in the following manner. When the PFP coincidence pulse and a coincidence pulse between the horizontal synchronizing signal and the audio PCM frame synchronizing signal are obtained, a pulse having the greatest common measure frequency of $f_H$ and $f_A$ is obtained at the output of the AND gate 52 as mentioned above. If this pulse is obtained the horizontal synchronization and audio PCM frame synchronization are established so that the pulse is supplied to an integrating circuit 53 which holds a voltage exceeding a certain value for a predetermined time. This voltage is supplied to a control circuit 56 which produces an output of a "1" signal during a time when a voltage exceeding a predetermined value is applied to its input and produces a "0" output when the input signal is less than said value. The output of the control circuit 56 is applied to the AND gate 55 to which also the gated input signal is applied and further to an inverter 58. The inverter 58 delivers a "0" output when it receives a "1" input and it produces a "1" output when it receives a "0" input. The output of this inverter 58 is supplied to an input of AND gate 57 which passes an ungated input signal. By this arrangement, when the pulse signal is not obtained at the output of the AND gate 52, i.e., when the horizontal synchronizing signal and the audio PCM frame synchronization signal are not obtained, the "0" signal from the control circuit 56 is applied to the AND gate 55 and to the inverter 58. Accordingly, although the gated input signal cannot pass the AND gate 55, a "1" signal is produced at the output of the inverter 58 so that the ungated input signal is allowed to pass the AND gate 57 and is supplied to the PFP coincidence circuit 51 and to the MCC coincidence circuit 36.

During the time when the horizontal synchronization and audio PCM frame synchronization have not been attained, if there is the same pattern as the PFP signal and MCC signal incidentally at a position other than the synchronizing signal, namely in the video or audio signal, a coincidence pulse is delivered from the PFP coincidence circuit 51 and the MCC coincidence circuit 36. In this event an erroneous coincidence pulse is applied to the integrating circuit 53 and during the period when the output voltage of the circuit 53 assumes a value higher than a predetermined value the control circuit 56 produces a "1" output. Therefore, during this period the input signal gated by the AND gate 54 is supplied to the PFP coincidence circuit 51 and to the MCC coincidence circuit 36. However, the gating is effected at a timing of erroneous coincidence pulse so that the gated input signal does not include the synchronizing signal. Furthermore, the incidentally produced pattern signal having the same shape of PFP signal and MCC signal does not have regular periodicity. Therefore, even if an erroneous coincidence pulse is produced incidentally, owing to the lack of periodicity it will not appear repeatedly. Accordingly, the output voltage of the integrating circuit 53 decreases and the output of the control circuit will assume value "0". By this "0" output the ungated input signal is again supplied to the PFP coincidence circuit 51 and MCC coincidence circuit 36 and the real PFP signal and MCC signal will be detected.

As with the manner mentioned above, the bit synchronizing signal, horizontal synchronizing signal and the audio PCM frame synchronizing signal are reproduced. If the horizontal synchronizing signal and audio PCM frame synchronizing signal are reproduced, it is now possible to gate the synchronizing signal 2 or 4 from the output of the identification circuit 23 so that the other synchronizing signals may be reproduced in the manner mentioned above by detecting the presence or absence of pulses 7–11 in the MCC signal. Namely, the gated input signal through AND gates 54 and 55 is arranged to include the PFP signal and the MCC signal and the signal is supplied to the MCC coincidence circuit 36 so as to obtain respective coincidence pulses. The respective coincidence pulses are supplied to respective synchronizing signal regenerators 28–32 and the respective synchronizing signals are regenerated therefrom. 28 is a frame synchronizing signal regenerator for regenerating a 30 Hz synchronizing signal for showing the switching time of each frame. 29 is a control frame synchronizing signal regenerator for regenerating a 1 Hz synchronizing signal showing the control frame. 30 is an audio first frame synchronizing signal regenerator and 31 is an audio second frame synchronizing signal regenerator for regenerating two 10 Hz synchronizing signals representing first and second audio frames, respectively. 32 is a video frame synchronizing signal regenerator for regenerating a synchronizing signal for showing the video frame. The audio frame synchronizing signal has repetition period of 10 Hz, but as there is not video frame at a position of the control frame as shown in FIG. 1-b, the pulse is skipped once per one second.

Figure 5:
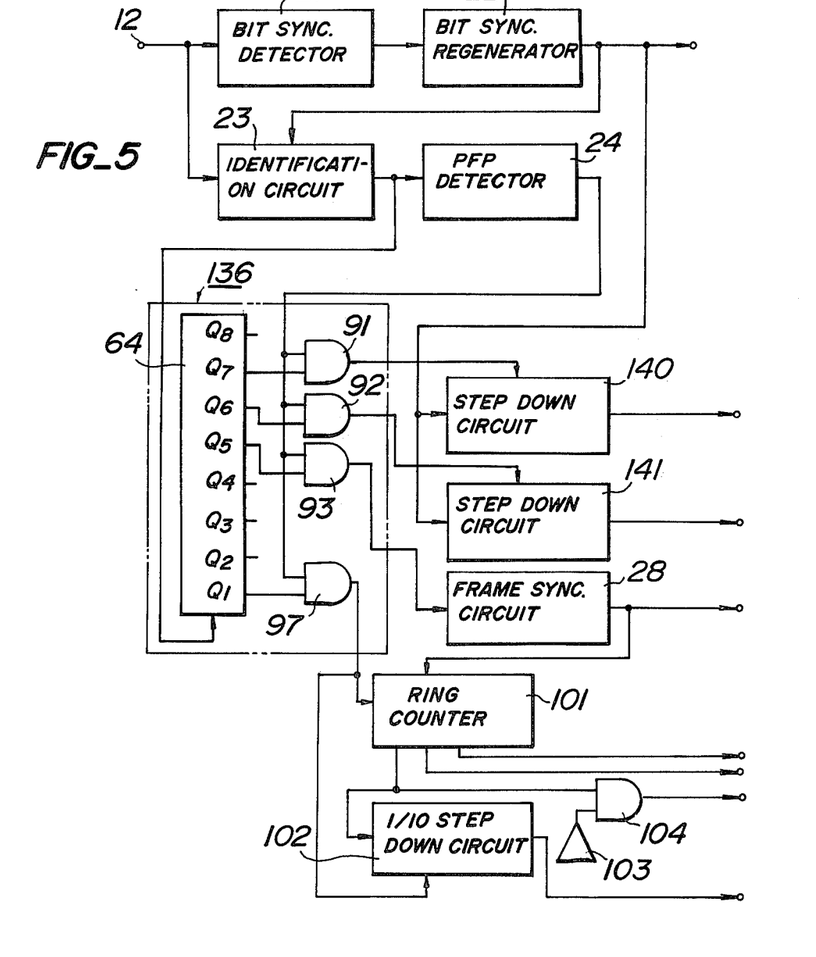
FIG. 5 is a synchronizing signal regenerator according to the present invention.
Figure 6:
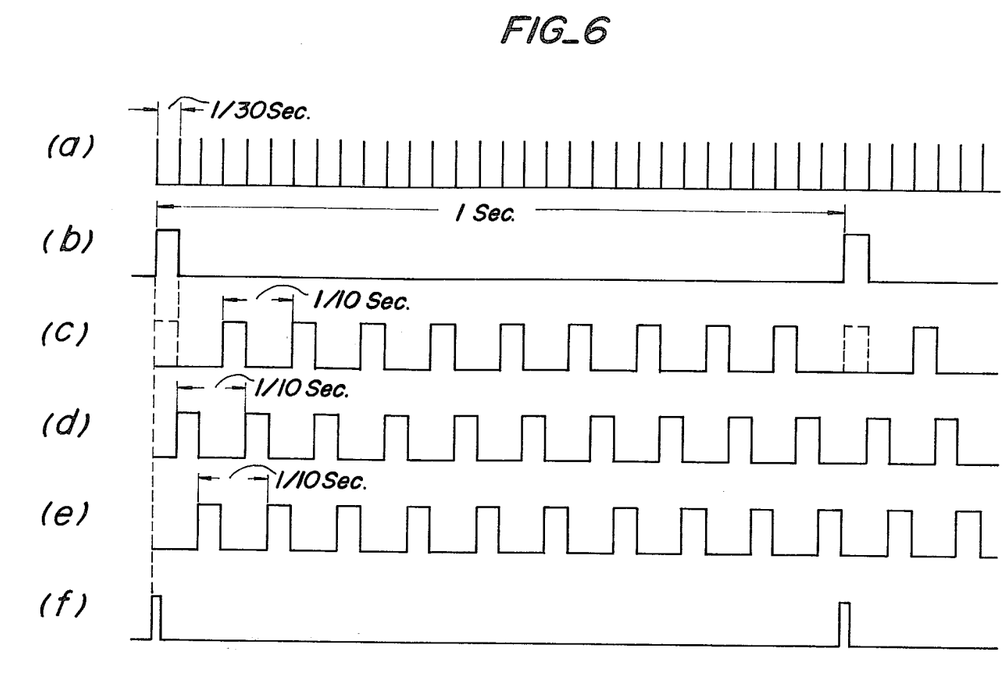
FIG. 6 is a signal wave form diagram for explaining the operation of the synchronizing signal regenerator shown in FIG. 5.

The present invention is intended to realize a synchronizing signal regenerator having a very simple construction and being able to detect synchronizing signal information from the MCC signal and to regenerate the plurality of synchronizing signals. One embodiment of the present invention is shown in FIG. 5, while FIG. 6 is a wave form diagram for explaining the operation thereof.

Now referring to FIG. 5, 21, 22 and 23 are the bit synchronizing signal detector, bit synchronizing signal regenerator and identification circuit which are the same as shown in FIG. 4. 24 is a PFP signal detector corresponding to detectoor 50 in FIG. 4. The difference of the detector 24 from the detector 50 shown in FIG. 4 is that the AND gate 52 is dispensed with and that only the output of the PFP coincidence circuit 51 is supplied to the integrator 53. Timing of a coincidence pulse produced from the PFP signal detector is made coincident with the timing of the last bit of the MCC signal as mentioned already.

136 shows the MCC coincidence circuit. This circuit is the same as shown in FIG. 8, but it detects only from synchronizing pulses. i.e., horizontal synchronizing signal 5, audio PCM frame synchronizing pulse 6, TV frame synchronizing pulse 7 and control frame synchronizing pulse 8 out of seven kinds of pulses 5–11 shown in FIG. 1-d. 64 is a shift register. Output terminals $Q_7$, $Q_6$, $Q_5$ and $Q_1$ of the stages of the shift register 64 corresponding to said four synchronizing pulse positions are coupled to AND gates 91, 92, 93 and 97, respectively. 140 and 141 are step down circuits which are the same as the step down circuits 40 and 41 for producing signals having identical repetition frequencies of the horizontal synchronizing signal and audio PCM frame synchronizing signal, respectively, by making step down of the bit synchronizing signal. The difference from the embodiment shown in FIG. 4 in this case is the different of repetition frequency of the reset pulse. In more detail in the embodiment shown in FIG. 4, the reset pulse for synchronizing the step down circuits 40 and 41 is the coincidence pulse of common measure frequency of the horizontal synchronizing signal ($f_H$) and audio PCM frame synchronizing signal ($f_A$), but in the present embodiment shown in FIG. 5 the reset pulse for the synchronization of the step down circuit 140 is the coincidence pulse of the horizontal synchronizing signal obtained at the output of an AND gate 91, and the reset pulse for the synchronization of the step down circuit 141 is the coincidence pulse of the audio PCM frame synchronizing signal obtained at the output of an AND gate 92. However, the means for regenerating the horizontal synchronizing signal and audio PCM frame synchronizing signal is not limited to the illustrated embodiment and the circuit shown in FIG. 4 may also be used for this object.

28 is a frame synchronizing signal regenerator and it comprises a voltage controlled oscillator and phase detector. The frame synchronizing signal regenerator 28 makes a comparison between a coincidence pulse of the TV frame synchronizing signal obtained from AND gate 93 of the MCC coincidence circuit 136 and the output of the voltage controlled oscillator in the phase detector and the oscillator is controlled by the output of the phase detector and regenerates a signal synchronized with the TV frame synchronizing signal. The reproduced frame synchronizing signal is as shown in FIG. 6-a and it has 1/30 second repetition period.

In order to reproduce the still picture broadcasting signal as shown in FIG. 1, not only the horizontal synchronizing signal, frame synchronizing signal and audio PCM frame synchronizing signal are required, but synchronizing signals synchronized with respective transmission periods are required since the video signal, the audio signal and the control signal are transmitted in time division as shown in FIG. 1-b. These synchronizing signals are shown in FIGS. 6-b to 6-e. FIG. 6-b shows a synchronizing signal representing the control frame. The control frame is transmitted for 1/30 second duration at each 1 second period so that a synchronizing signal having a 1/30 second pulse width and 1 second repetition period as shown in FIG. 6-b is required. FIG. 6-c shows a synchronizing signal representing the video frame. The video frame is inserted once at each three TV frames as shown in FIG. 1-b and not transmitted at the time of the control frame. Therefore, the synchronizing signal should have the wave form as shown in FIG. 6-c, in which each pulse has a 1/30 second pulse width transmitted at each 1/10 second and is not transmitted once per each second at a time of occurrence of the control frame. FIGS. 6-d and 6-e show synchronizing signals representing audio first and second frames respectively. The audio frame is the portion other than the control frame and video frame. Two audio frames are transmitted at each one TV frame. In one audio frame, the frame is divided into an audio first frame and audio second frame each having a one TV frame duration so that as shown in FIGS. 6-d and 6-e, a synchronizing signal representing the audio first frame and that representing the audio second frame each having a 1/30 second pulse width and 1/10 second repetition period are required. The audio first frame synchronizing signal and the audio second frame synchronizing signal are shifted 1/30 second with respect to each other and each of these signals is also shifted 1/30 second with respect to the synchronizing signal for the video frame and control frame.

For the regeneration of the control frame synchronizing signal, video frame synchronizing signal, audio first and second frame synchronizing signals, the MCC signal can be utilized. The MCC signal is as shown in FIG. 2 inserted at the repetition frequency $f_A$ of the audio PCM frame synchronizing signal in the audio frame and at the repetition frequency $f_H$ of the horizontal synchronizing signal in the video frame and in the control frame. Accordingly, if the control frame synchronizing pulse is detected from the MCC signal, a pulse series having a frequency of $f_H$ (15.734 KHz) is detected once in one second and for a duration of 1/30 second. In the same manner, the video frame synchronizing pulse or audio first or second synchronizing pulse is detected as a pulse series having a frequency $f_H$ or $f_A$ in a respective frame and at a corresponding time for a duration of 1/30 second. In order to convert such detected signal to be a synchronizing signal having a 1/30 second pulse width, an integrating circuit or a monostable flip-flop circuit had been used in the known circuit. However, in the embodiment of the present invention shown in FIG. 5, such an integrating circuit or monostable flip-flop is not required. In the circuit shown in FIG. 5, by supplying the frame synchronizing signal regenerated by the frame synchronizing signal regenerator 28 as shown in FIG. 6-a to a ⅓ frequency divider 101 formed as a ring counter, three pulse series each having a 1/30 second pulse width and 1/10 second repetition frequency and having a phase shifted ⅓ period with respect to each other are obtained. One of said 1/10 second repetition period signal is supplied to a 1/10 frequency divider circuit 102 and to obtain a signal having a 1 second repetition period.

By the aforementioned procedure, the control frame synchronizing signal, audio first and second frame synchronizing signals, and video frame synchronizing signal all having an identical repetition period can be regenerated from the frame synchronizing signal. By this regeneration, the phase of the respective synchronizing signal is not in coincidence. As mentioned above, the necessary phase relationship of the various synchronizing signals is as shown in FIGS. 6-b to 6-e.

For obtaining the phase relationship as shown in FIGS. 6-b to 6-e between the output signals from the ⅓ frequency divider 101 and 1/10 frequency divider 102, a pulse signal synchronized with the control frame synchronizing signal as shown in FIG. 6-f is produced by using a coincidence pulse output obtained from AND gate 97 which produces said coincidence pulse when it receives at its input the control frame synchronizing pulse 11 from the MCC coincidence circuit 136. This pulse is supplied to the ⅓ frequency divider 101 and 1/10 frequency divider 102 as the reset pulse, a pulse signal having a 1/10 second period as shown in FIG. 6-c by a broken line and full line and a pulse signal having a 1 second period as shown in FIG. 6-b being derived respectively. Three output pulses from the ⅓ frequency divider 101 formed as a ring counter are basically shifted ⅓ period with respect to each other so that it suffices to make coincident the phase of only one of the three output pulses. The output of 1/10 frequency divider 102 is supplied to one input of an AND gate 104 through an inverter 103. To the other input of said AND gate 104, one of the three output pulses of the ⅓ frequency divider 101 having identical phase with the build up of the control frame synchronizing pulse signal is applied. By the logical product of the two pulses obtained from the AND gate 104, a video frame synchronizing signal as shown in FIG. 6-c by full line in which one pulse is lacking at each second can be obtained. The two other output pulses of the ⅓ frequency divider 101 are used as audio first and second frame synchronizing signals without adding further process. An output of the 1/10 frequency divider 102 is used as the control frame synchronizing signal.

The ⅓ frequency divider 101 and the 1/10 frequency divider 102 may be formed by a conventional flip-flop circuit so that the synchronizing signal regenerator may be formed in a very simple manner.

The present invention has been explained for use as an example of a reception of a still picture broadcasting signal as shown in FIG. 1. However, the control frame (CF) of FIG. 1 may be substituted by a video frame. In such a case, three pulses, i.e., a pulse shown in FIG. 6-c including the broken line portion and pulses shown in FIGS. 6-d and 6-e are to be regenerated. For regenerating these pulses in the place of the AND gate 97 for detecting the control frame synchronizing pulse detector 28, a circuit for deriving either one of the video frame synchronizing pulse, audio first and second frame synchronizing pulses is provided to substitute therefor and by using the output of the circuit the ⅓ frequency divider 101 is controlled so as to obtain the three kinds of frame pulses at the output. In this case the 1/10 frequency divider 102, inverter 103 and the AND gate 104 can also be dispensed with and the circuit construction becomes still more simple.

As described above in accordance with the present invention, a composite signal having various kinds of synchronizing signals such as for instance a still picture broadcasting signal may be processed and the respective synchronizing signals can be regenerated in a simple manner.

What is claimed is:

1. A synchronizing signal regenerator for regenerating synchronizing signals in a composite signal including a video signal and pulse code modulated audio multiplex signals transmitted in a predetermined sequence, and further including first synchronizing signals having a predetermined number of pulses synchronized with a modulated pulse series of said audio multiplex signals and forming a fixed pulse pattern, and pulse code modulated second synchronizing signals located following said first synchronizing signals and including a plurality of other synchronizing signals required for the reproduction of said video and audio multiplex signals, wherein said first and second synchronizing signals are inserted in said video and audio multiplex signals and transmitted at a predetermined period, the regenerator comprising:

first means for detecting said fixed pulse pattern of said first synchronizing signals and for regenerating a first signal synchronized with said transmitted period of said first synchronizing signals;

second means for detecting predetermined synchronizing signals of said second synchronizing signals which are located in predetermined positions thereof including means for using said regenerated first signal as a reference, and for regenerating second signals each synchronized with said predetermined synchronizing signals of said second synchronizing signals means for dividing the frequency of at least one of said regenerated second signals; and first means for regenerating the rest of said second synchronizing signals including means for obtaining synchronization of said frequency divided signal with another signal regenerated by said second means for detecting and regenerating and having common phase with one of the rest of said second synchronizing signals to be regenerated by said first means for regenerating.

2. A synchronizing signal regenerator as claimed in claim 1, wherein said means for regenerating the first synchronizing signal comprises:
- a coincidence circuit for producing a coincidence pulse when pulses having a pattern which is the same as the fixed pulse pattern of the first synchronizing signals having a predetermined number of pulses are applied to an input thereof;
- means for applying said composite signal to said coincidence circuit;
- means for producing a first signal having a repetition frequency which is the same as the repetition frequency of said transmitted period of said first synchronizing signals; and
- means for controlling said first signal producing means with said coincidence pulse obtained from said coincidence circuit, so that said first signal produced by said means for producing is synchronized with said transmitted period of said first synchronizing signals.

3. A synchronizing signal regenerator for regenerating synchronizing signals in a composite signal including a video signal and pulse code modulated audio multiplex signals transmitted in a predetermined sequence, and further including first synchronizing signals having a predetermined number of pulses synchronized with a modulated pulse series of said audio multiplex signals and forming a fixed pulse pattern, and pulse code modulated second synchronizing signals located following said first synchronizing signals and including a plurality of other synchronizing signals required for the reproduction of said video and audio multiplex signals, wherein said first and second synchronizing signals are inserted in said video and audio multiplex signals and transmitted at a predetermined period, the regenerator comprising:
- means for detecting said fixed pulse pattern of said first synchronizing signals and for regenerating a first signal synchronized with said transmitted period of said first synchronizing signals;
- means for detecting predetermined synchronizing signals in said second synchronizing signals which are located in predetermined positions thereof including means for using said regenerated first signal as a reference, and for regenerating second signals each synchronized with said predetermined synchronizing signals;
- means for dividing the frequency of at least one of said regenerated second signals, and for producing a plurality of signals having the same repetition frequency but different phases; and
- means for controlling each phase of said plurality of signals having the same repetition frequency with a regenerated signal having a common phase with the rest of the second synchronizing signals to be regenerated.

4. A synchronizing signal regenerator as claimed in claim 3, wherein said means for regenerating the first synchronizing signal comprises;
- a coincidence circuit for producing a coincidence pulse when pulses having a pattern which is the same as the fixed pulse pattern of the first synchronizing signals having a predetermined number of pulses are applied to input thereof;
- means for applying said composite signal to said coincidence circuit;
- means for producing a first signal having a repetition frequency which is the same as the repetition frequency of said transmitted period of said first synchronizing signals; and
- means for controlling said first signal producing means with said coincidence pulse obtained from said coincidence circuit, so that first signal produced by said means for producing is synchronized with said transmitted period of said first synchronizing signals.

5. A synchronizing signal regenerator for regenerating synchronizing signals in a composite signal including a video signal and pulse code modulated audio multiplex signals transmitted in a predetermined sequence, and further including a first synchronizing signal having a predetermined number of pulses synchronized with a modulated pulse series of said audio multiplex signals and forming a fixed pulse pattern, and pulse code modulated second synchronizing signals located following said first synchronizing signals and including two synchronizing signals having repetition frequencies, respectively, of $x$ and $y$ in a relation of $x/y=n$, wherein $n$ is an integer, and a plurality of synchronizing signals having a repetition frequency equal to $y$ and having a phase difference of $1/n$ period with respect to each other, these first and second synchronizing signals being required for regenerating said video and audio multiplex signals and being inserted in said video and audio multiplex signals and transmitted at a predetermined period, the regenerator comprising:
- means for detecting said fixed pulse pattern of said first synchronizing signals and for regenerating a first signal synchronized with said transmitted period of said first synchronizing signals;
- means supplied with said first signal as a reference for detecting synchronizing signals having the repetition frequency $x$ from said composite signal, and for regenerating a second signal synchronized with said detected synchronizing signals having repetition frequency $x$;
- a ring counter for $1/n$ frequency dividing the frequency of an input signal;
- means for dividing the frequency of said second signal by means of said ring counter so as to produce signals having a repetition frequency equal to $y$ and having their phase shifted by $1/n$ period with respect to each other; and
- means for regenerating signals each synchronized with said second synchronzing signals having a repetition frequency $y$ included in the input composite signal including means for applying said second signal to the ring counter as a reset pulse.

6. A synchronizing signal regenerator as claimed in claim 5, wherein said means for regenerating the first synchronizing signal comprises:
- a coincidence circuit for producing a coincidence pulse when pulses having a pattern which is the same as the fixed pulse pattern of the first synchronizing signals having a predetermined number of pulses are applied to an input thereof;
- means for applying said composite signal to said coincidence circuit;
- means for producing a first signal having a repetition frequency which is the same as the repetition frequency of said transmitted period of said first synchronizing signals; and means for controlling said first signal producing means with said coincidence pulse obtained from said coincidence circuit, so that said first signal produced by said means for producing is synchronized with said transmitted period of first synchronizing signals.

7. A synchronizing signal regenerator for regenerating synchronizing signals in a composite signal including a video signal and pulse code modulated audio multiplex signals transmitted in a predetermined sequence, and further including a synchronizing pulse series having a predetermined number of pulses synchronized with a modulated pulse series of said audio multiplex signal and forming a fixed pulse pattern, and also a pulse code modulated synchronizing signal group located following said synchronizing pulse series and including a first synchronizing signal having repetition frequency $x$ and a plurality of second pulse code modulated synchronizing signals having repetition frequency $y$ in a relation of $y=x/n$, wherein $n$ is an integer, and having phases $2\pi/n$ radians different from each other, and a third synchronizing signal having a repetition frequency which is the same as a common measure frequency of said $x$ and $y$ and having a phase which is the same as that common to one of said second synchronizing signals and the first synchronizing signal, the synchronizing pulse series and synchronizing signal group being inserted in said video and audio multiplex signals and transmitted at a predetermined period, the regenerator comprising:

a coincidence circuit for producing a coincidence signal when pulses having a pattern which is the same as the fixed pulse pattern of said synchronizing pulse series are applied to an input thereof;

means for applying said composite signal to said coincidence circuit;

means for generating a first gating signal including means for shifting the phase of said coincidence signal;

means for gating said composite signal with said first gating signal so as to reproduce said first synchronizing signal having repetition frequency $x$;

a ring counter for dividing the frequency of said reproduced first synchronizing signal into $1/n$ and for producing a plurality of signals having a phase difference of $2\pi/n$ radians with respect to each other;

means for generating a second gating signal including means for shifting the phase of said coincidence signal;

means for gating said composite signal with said second gating signal so as to reproduce said third synchronizing signal; and means for reproducing signals having repetition frequency $y$ and synchronized with said plurality of second pulse code modulated synchronizing signals, respectively, including means for supplying said reproduced third synchronizing signal to said ring counter as a reset signal.

* * * * *